Nov. 23, 1965 M. R. PETIT 3,218,966

APPARATUS FOR DECODING AND PRINTING DIGITAL DATA

Filed Nov. 12, 1963 10 Sheets-Sheet 1

INVENTOR
MARCEAU R. PETIT
BY Albert C. Johnston
ATTORNEY

Nov. 23, 1965 M. R. PETIT 3,218,966

APPARATUS FOR DECODING AND PRINTING DIGITAL DATA

Filed Nov. 12, 1963 10 Sheets-Sheet 2

INVENTOR
MARCEAU R. PETIT
BY Albert C. Johnston
ATTORNEY

Nov. 23, 1965 M. R. PETIT 3,218,966

APPARATUS FOR DECODING AND PRINTING DIGITAL DATA

Filed Nov. 12, 1963 10 Sheets-Sheet 3

INVENTOR
MARCEAU R. PETIT
BY Albert C. Johnston
ATTORNEY

INVENTOR
MARCEAU R. PETIT
BY Albert C. Johnston
ATTORNEY

Nov. 23, 1965 M. R. PETIT 3,218,966

APPARATUS FOR DECODING AND PRINTING DIGITAL DATA

Filed Nov. 12, 1963 10 Sheets-Sheet 5

INVENTOR
MARCEAU R. PETIT
BY Albert C. Johnston
ATTORNEY

INVENTOR
MARCEAU R. PETIT
BY
Albert C. Johnston
ATTORNEY

INVENTOR
MARCEAU R. PETIT
BY
Albert C. Johnston
ATTORNEY

Nov. 23, 1965 M. R. PETIT 3,218,966

APPARATUS FOR DECODING AND PRINTING DIGITAL DATA

Filed Nov. 12, 1963 10 Sheets-Sheet 8

INVENTOR
MARCEAU R. PETIT
BY
Albert C. Johnston
ATTORNEY

APPARATUS FOR DECODING AND PRINTING DIGITAL DATA

INVENTOR
MARCEAU R. PETIT
BY Albert C. Johnston
ATTORNEY

APPARATUS FOR DECODING AND PRINTING DIGITAL DATA

Filed Nov. 12, 1963 10 Sheets-Sheet 10

INVENTOR
MARCEAU R. PETIT
BY
Albert L. Johnston
ATTORNEY

United States Patent Office
3,218,966
Patented Nov. 23, 1965

3,218,966

APPARATUS FOR DECODING AND PRINTING DIGITAL DATA

Marceau Roger Petit, Clichy, France, assignor to Societe a Responsabilite Limitee Societe Lamy d'Etudes et de Recherches "S.O.L.E.R.," Courbevoie, France, a corporation of France Filed Nov. 12, 1963, Ser. No. 322,806
Claims priority, application France, Dec. 12, 1960, 846,689
10 Claims. (Cl. 101—95)

The present invention relates to apparatus for decoding and printing digital data. This application is a continuation-in-part of my co-pending U.S. application Serial No. 82,330, filed January 12, 1961, now abandoned.

It is especially concerned with apparatus for decoding binary data and printing the decoded values, of the type comprising one or more type-bearing recording wheels, means for rotating each wheel, an electro-magnetically operated means for each wheel adapted to block said wheel and determining the period in each operating cycle during which the wheel is effectively driven in accordance with the decoded value to be printed, and a printer device adapted to be actuated during each cycle after the type-carrying wheel or wheels have been thus positioned.

Apparatus of the above described type is known wherein each type wheel is rotationally driven by frictional engagement with a rotating element. When the desired position for the wheel has been obtained, an electronic coincidence gate system acts to energize the electromagnet and a latch acts to block further rotation of the wheel.

This known apparatus has a number of disadvantages. The frictional drive is a source of trouble and reduces the accuracy of operation of the mechanism. The electronic coincidence system for determining the latched position is complicated and expensive.

The invention has as its object to provide apparatus operating on a different principle, and one which shall overcome the afore-mentioned disadvantages and afford advantages in regard to constructional simplicity and operating efficiency.

The invention provides an apparatus for decoding binary digital data and for printing the decoded values, comprising: one or more type wheels, driver means for rotating each one of said wheels, an electro-magnetically operated means for each wheel for locking in position the same so as to determine, for each operating cycle, the period during which the type wheel is driven as a function of the decoded value to be printed, and a printing device effective to operate during each cycle after the positioning of each type-wheel or wheels; wherein each type wheel is provided with constant-pitch gear-teeth at least over an active portion thereof, and is carried by a dual-arm or yoke pivoted on a stationary axis and capable, on one hand, of assuming, under a resilient biassing force, a meshing position in which the type-wheel meshes with an associated toothed driver wheel means, and on the other hand of assuming, under the combined action of an electromagnet and of its driver wheel in the zero or resetting position of the latter, a locked position in which said type-wheel is held in spaced apart relationship from its driver wheel by energizing of the electromagnet, while its movement into meshing position is effected by the action of said resilient force as the electromagnet is de-energized and the driver wheel is positioned for receiving the data.

The attraction force of the electromagnet when energized is sufficient to hold said dual-arm or yoke in the position for disengaging the type wheel, but insufficient for attracting it when the arm is in the engaged position.

The resetting of the type wheels is effected by the same drive wheels which position the type wheels for recording the transmitted data, the drive wheels being in this case actuated for this dual purpose, so as to effect a rotation, followed by a stationary period, followed by another rotation, the resetting of the type wheels to zero being effected during the latter rotation period.

The locking of each type-wheel is achieved by the cooperation of its gear teeth with a stationary stop member, said wheel being at said gear teeth of the type moment spaced apart from the teeth of its driving wheel.

The gear teeth of the type-wheel include a concave uncut or blank portion thereon adapted to cooperate with the zero-resetting means, so as to move the type-wheel to zero position and place the carrier arm in the locked position, the means for arresting the type-wheel in the zero position including a chamfered tooth thereon abuttingly engaging a fixed stop member and a further tooth engageable under a spring leaf as the type-wheel reaches its zero position.

The means for determining the driving period for the type wheel or wheels includes a single pulse transmitter adapted to produce, during each operating cycle, at least one pulse of predetermined duration in each of the binary channels, this duration determining the time of entering into meshing engagement of the type-wheel with its drive wheel; each type-wheel being reset to zero in the interval of time between the printing action and the termination of the cycle.

The apparatus according to the invention has the following advantages:

The rotational drive is positive so that no angular displacement or shift is liable to occur during operation of the apparatus. At the end of each operating cycle, the type wheels are reset thereby providing further assurance of proper operation. The decoding in all printing sections is provided by a single pulse transmitter thereby contributing to constructional simplicity.

According to the invention, the pulse transmitter comprises a switch in each of the binary channels and a control member for each switch, which control members are adapted to close their respective switches for a predetermined time period depending on the decoding system used.

The control member for each switch is a cam which may be rotated in synchronism with the type wheel drive means.

The decoding of the decimal digit is achieved by controlling the time of energization of the electromagnet in each of the printing sections, said time determining the moment of entering into meshing engagement of each type-wheel with a driver wheel, said moment being in turn determined by the termination of the energization of said electromagnet.

The meshing engagement of the type-wheel thus produced results, at said moment, in a more or less extended rotation thereof, as measured by the number of steps of teeth.

The apparatus of the invention may assume various forms of embodiment. One such form is described hereinafter as a non-restrictive example, with reference to the accompanying drawings wherein.

Figure 1:
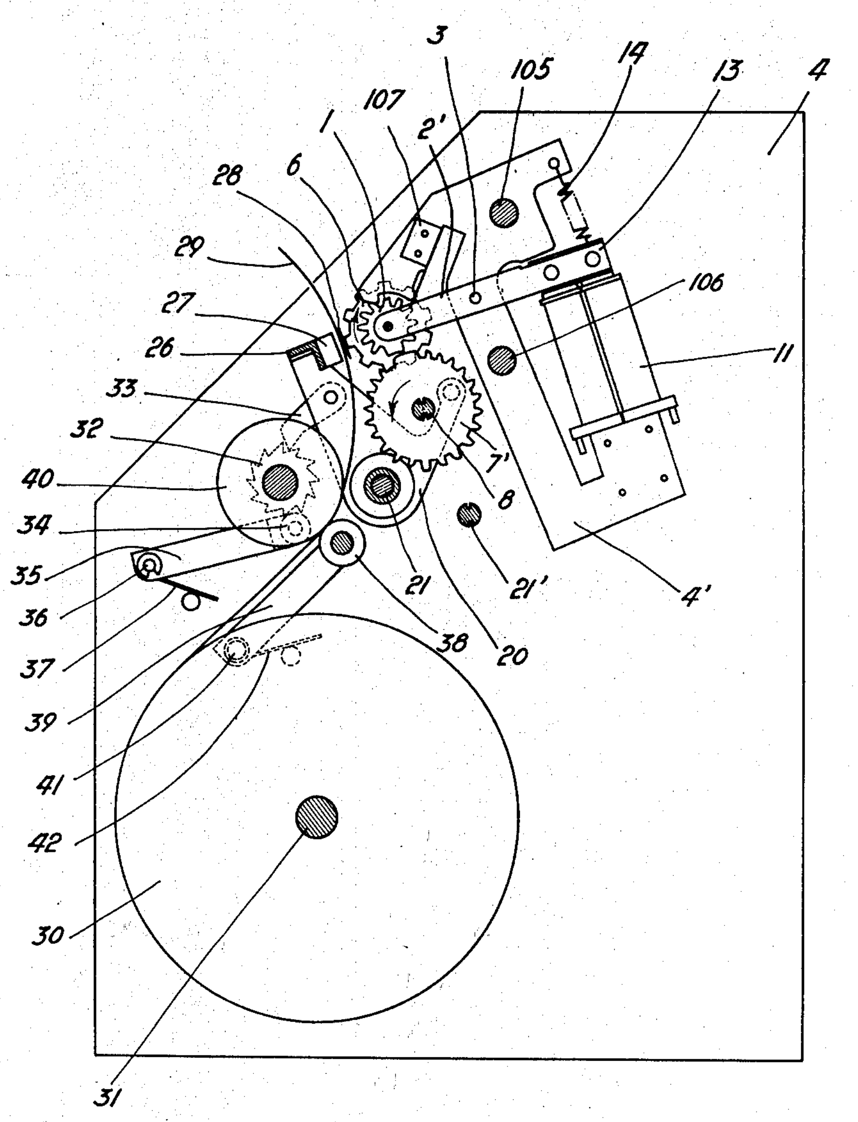
FIG. 1 shows the apparatus in transverse cross section.

As shown in FIGURES 1 to 8, apparatus constructed in accordance with the invention comprises, in the selected example, a number of printing sections each section including a gear 1 (FIGS. 1 to 6) mounted for free rotation at one end of two arms 2' forming a clevis and pivoted on a shaft 3 carried by an individual flange 4', each flange 4' being carried on the apparatus frame 4 through shafts 105 and 106 extending through holes formed in the flange.

The gear 1 has a set of teeth 5' and is rigidly secured to a type disk 6. For simplicity the assembly including gear 1 and disk 6 will be designated hereinafter as the type wheel 1–6 meaning that any displacement of gear 1 is attended by a corresponding displacement of type disk 6.

Positioned near wheel 1–6 is a so-called driving-and-resetting wheel secured on a shaft 8, and having a set of teeth comprising a "driving" gear sector 7'*a*, a "printing" gear tooth 7'*b*, a "resetting" gear sector 7'*c* and a broad gear tooth 7'*d* formed by an uncut portion of the wheel.

An electromagnet 11 comprising two coil windings 11*a* and 11*b* is secured to flange 4'. The arms 2' carry an armature 13 adapted to be attracted by electromagnet 11. The arms 2 are moved away from the electromagnet 11 by a biasing force produced by a spring 14 which has one end attached to a pin 2'*a* carried by the arms 2' and its other end attached to a fixed point 15' of flange 4'.

Figure 2:
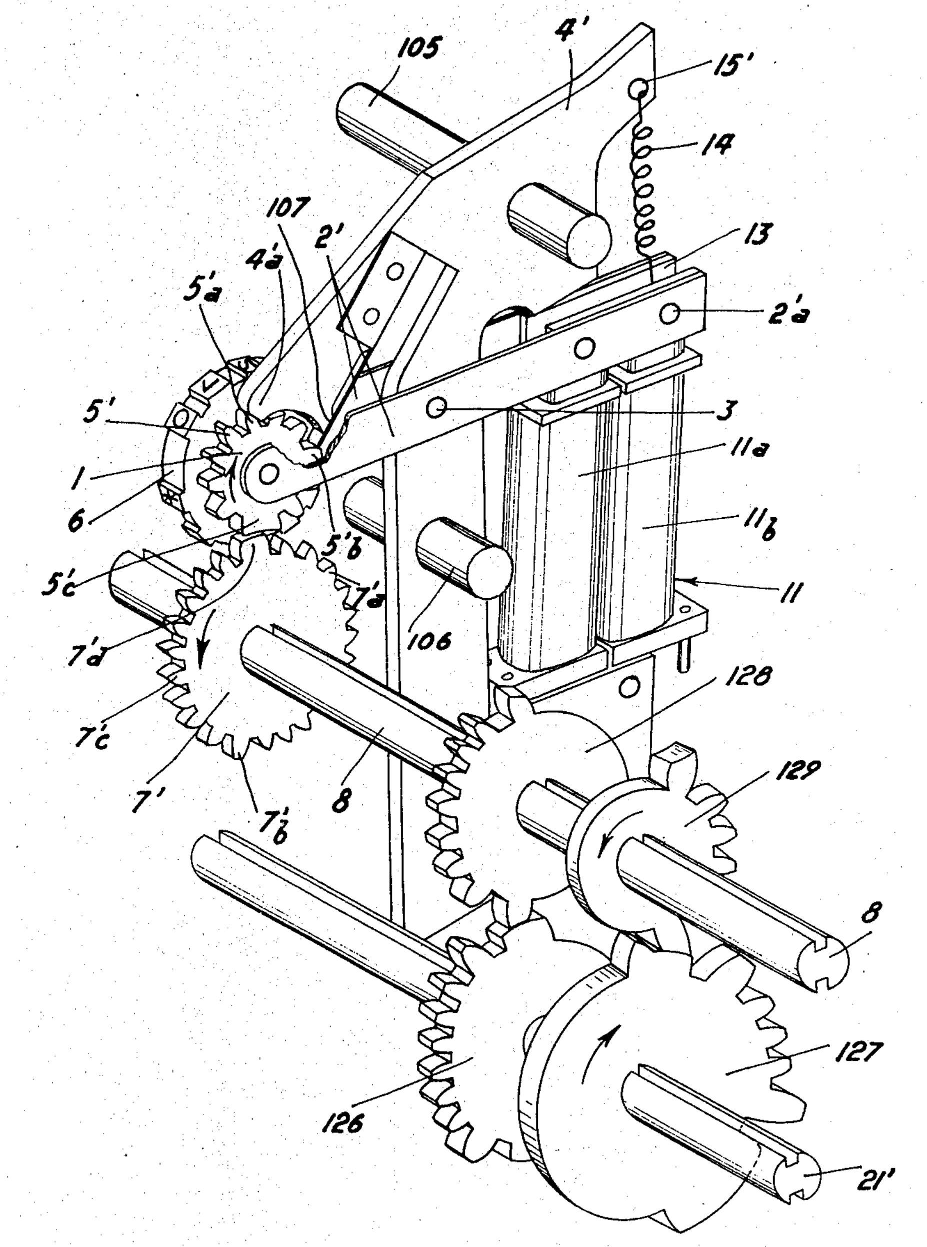
FIG. 2 shows, in perspective, one printing section, the components being shown in blocked or latched position.
Figure 3:
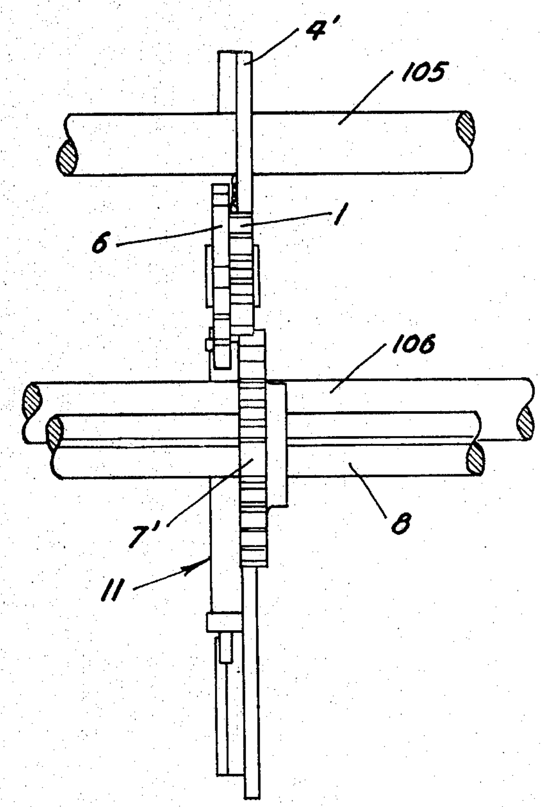
FIG. 3 shows a printing section in elevation.

The arms 2' can be placed in either of two extreme positions. In the position shown in FIGURE 2, the so-called blocked position, the tooth 5'*a* of the set of gear teeth 5' of wheel 1–6 engages a nose 4'*a* formed on flange 4', tooth 5'*b* is retained by a leaf spring 107 secured to the flange 4', and the chambered tooth 5'*c* extends along the surface of a fictive cylinder defined by the path of the apices of the gear teeth 7'*c* of wheel 7'. Cooperation of tooth 5'*a*, nose 4'*a*, tooth 5'*b*, spring 107, tooth 5'*c* and the apices of the teeth 7'*c* determines the latched position which is retained by tooth 7'*d* when the driving wheel 7' reaches its zero position as shown in FIGURE 2.

In the latched position armature 13 is in engagement with the core of electromagnet 11.

As the driver wheel 7' moves away from its zero position, if electromagnet 11 is energized, the type wheel 1 remains in latched position until the electromagnet is deenergized.

The other extreme position of arms 2' (FIG. 4) is obtained by the meshing engagement of the gear teeth 5' of wheel 1–6 with the gear teeth of wheel 7'. The arms are brought to that position by the action of spring 14 as the driver wheel 7' presents its teeth 7'*a* and as the electromagnet 11 becomes deenergized. This is the so-called "meshing" position.

As shown in FIGURES 1 to 6, the driver wheel 7' includes four kinds of teeth. In the zero position the uncut portion 7'*d* acts to retain the armature 13 of arms 2' against the core of electromagnet 11.

As the driver wheel 7' moves away from the zero position it presents a sector including fore-shortened teeth 7'*a* which permit engagement of the gear teeth 5' of wheel 1–6 with the teeth 7'*a* if electromagnet 11 is deenergized.

For this purpose the teeth 7'*a* are so shaped that the type wheel 1–6 is urged by spring 14 into meshing engagement with wheel 7', the stop tooth 5'*a* disengages the nose 4'*a* of flange 4' and the chamfered tooth 5'*c* engages the convex portion of the teeth 7'*a* and smoothly enters into meshing engagement with the wheel 7'.

Figure 7:
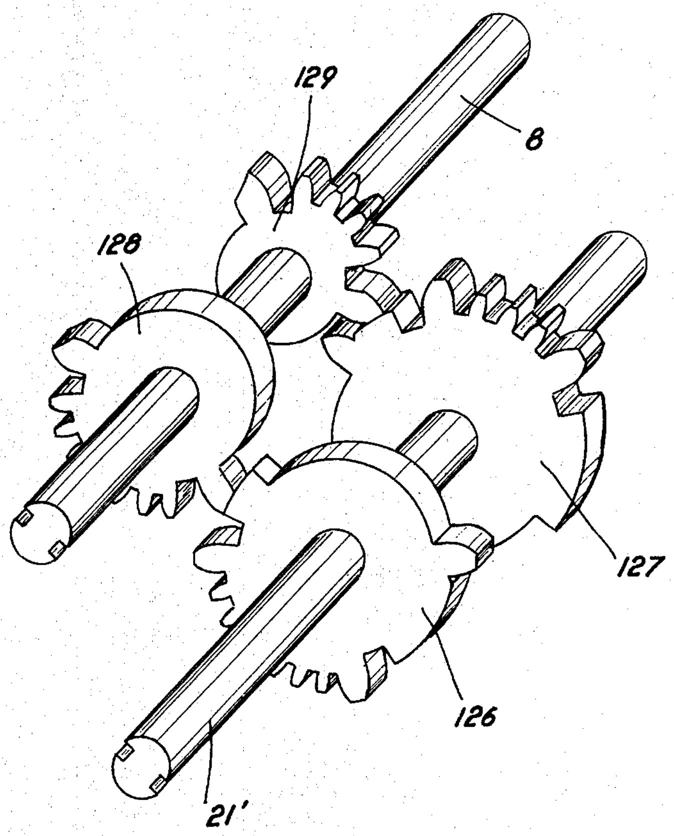
FIG. 7 shows the drive for the type wheel control shaft.
Figure 10:
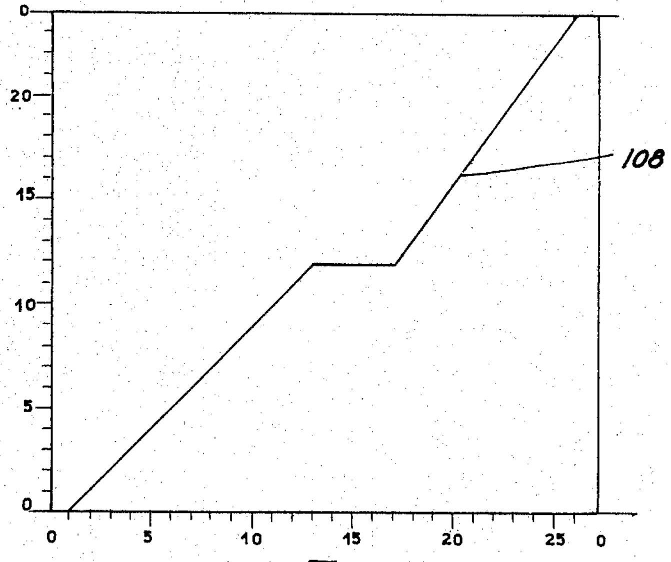
FIG. 10 is a timing chart of the drive wheel movement.

The shaft 8 has imparted to it an intermittent motion as shown by chart 108 in FIGURE 10, through the kinematic drive chain illustrated in FIGURES 2 and 7, from a source of motive power not shown.

The input shaft 21' is driven through a one-revolution clutch of any conventional type. Secured on the said shaft are two control wheels 126 and 127 adapted to impart intermittent movement to two wheels 128 and 129 secured on the shaft 8. These intermittent-drive wheels may be of any conventional type and the ones shown in FIGURES 2 and 7 have been selected for purposes of exemplification only.

The drive wheel 7' on having been advanced a definite number of steps by shaft 8 comes to a stop in its printing position and presents the tooth 7'*b* which ensures the proper meshing engagement for the printing action.

Figure 6:
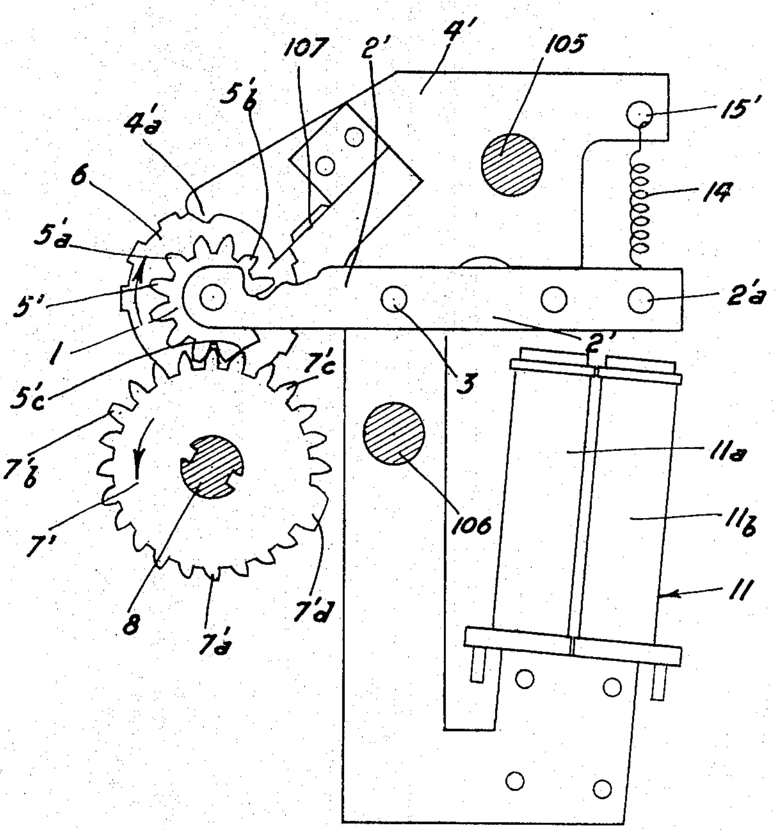
FIG. 6 shows the type wheel in resetting position.

After printing has been completed the driver wheel 7' is again started in rotation and presents a gear sector 7'*c* which includes the so-called resetting gear teeth. On presentation of the chamfered tooth 5'*c*, since this does not permit meshing engagement as shown in FIGURE 6, the type wheel 1–6 is pushed away from wheel 7' and the tooth 5'*a* engages the nose 4'*a* of flange 4' while the tooth 5'*b* has become engaged under the leaf spring 107. The type wheel 1–6 cannot at such time rotate either one way or the other. The arm 2' cannot move down in response to spring 14 since the type wheel is held stationary by the nose 4'*a* and the spring 107, and additionally by the chamfered tooth 5'*c* engaging the top of teeth 7'*c*. The arms 2' therefore are held in latched position. As the drive wheel 7' reaches its zero position, it presents its uncut portion 7'*d* to the tooth 5'*c* and the latched position will be retained so long as the drive wheel 7' remains in zero position and as long as electromagnet 11 stays energized.

Figure 8:
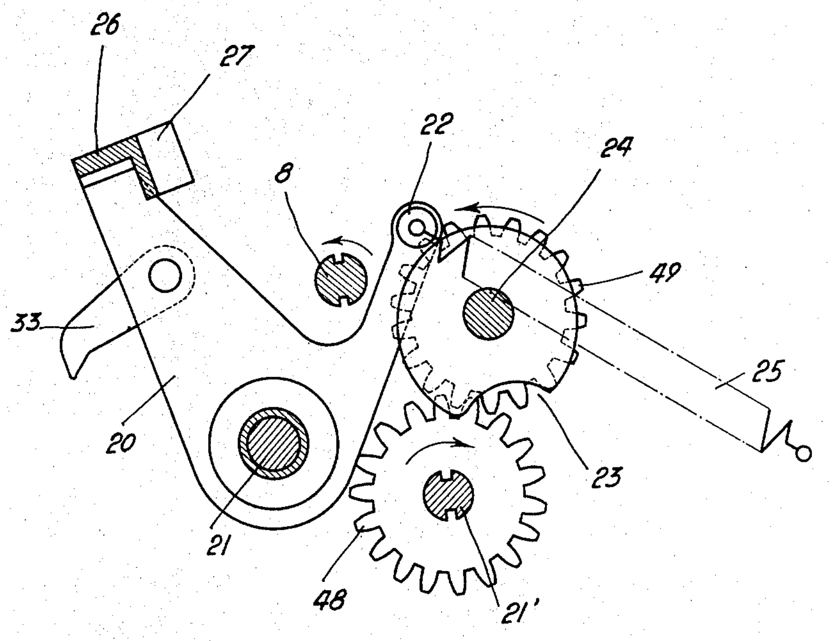
FIG. 8 shows the control mechanism of the printing lever.

The printer device of the apparatus comprises a bell-crank lever 20 (FIGS. 1 and 8) pivoted about a shaft 21 carried by frame 4. As shown in FIGURE 8, one end of the lever 20 carries a roller 22 continually maintained in engagement with a cam 23 mounted on a shaft 24 by a spring 25 exerting a pull on the end of the lever 20. At the other end of the lever 20 (the lever may be made from two parallel spaced bent elements mounted on a common shaft 21) there is arranged a cross-member 26 carrying a resilient block 27. The cam 23 is so shaped that, at every revolution of shaft 24, block 27 is urged towards wheel 1–6. The shaft 24 is driven by the pinion 49 thereon which meshes with the pinion 48 on the input shaft 21'.

Interposed between block 27 and wheel 1–6 is an inking ribbon 28 and a paper strip 29 the latter being unwound from a roll 30 carried by a shaft 31 mounted on the frame 4.

Mounted near the lever 20 is a ratchet 32 (FIGURE 1) with which a pawl 33 carried by the lever 20 can cooperate. The ratchet 32 is exposed to the action of an indexing roller 34 carried by an arm 35 pivoted on a shaft 36 and rocked by the force of a spring 37. A presser roll 38 carried by an arm 39 applies the paper strip against a drive roll 40 rigidly secured to the ratchet 32.

The arm 39 is pivoted about a shaft 41 and is exposed to the biassing force of a spring 42.

Figure 9:
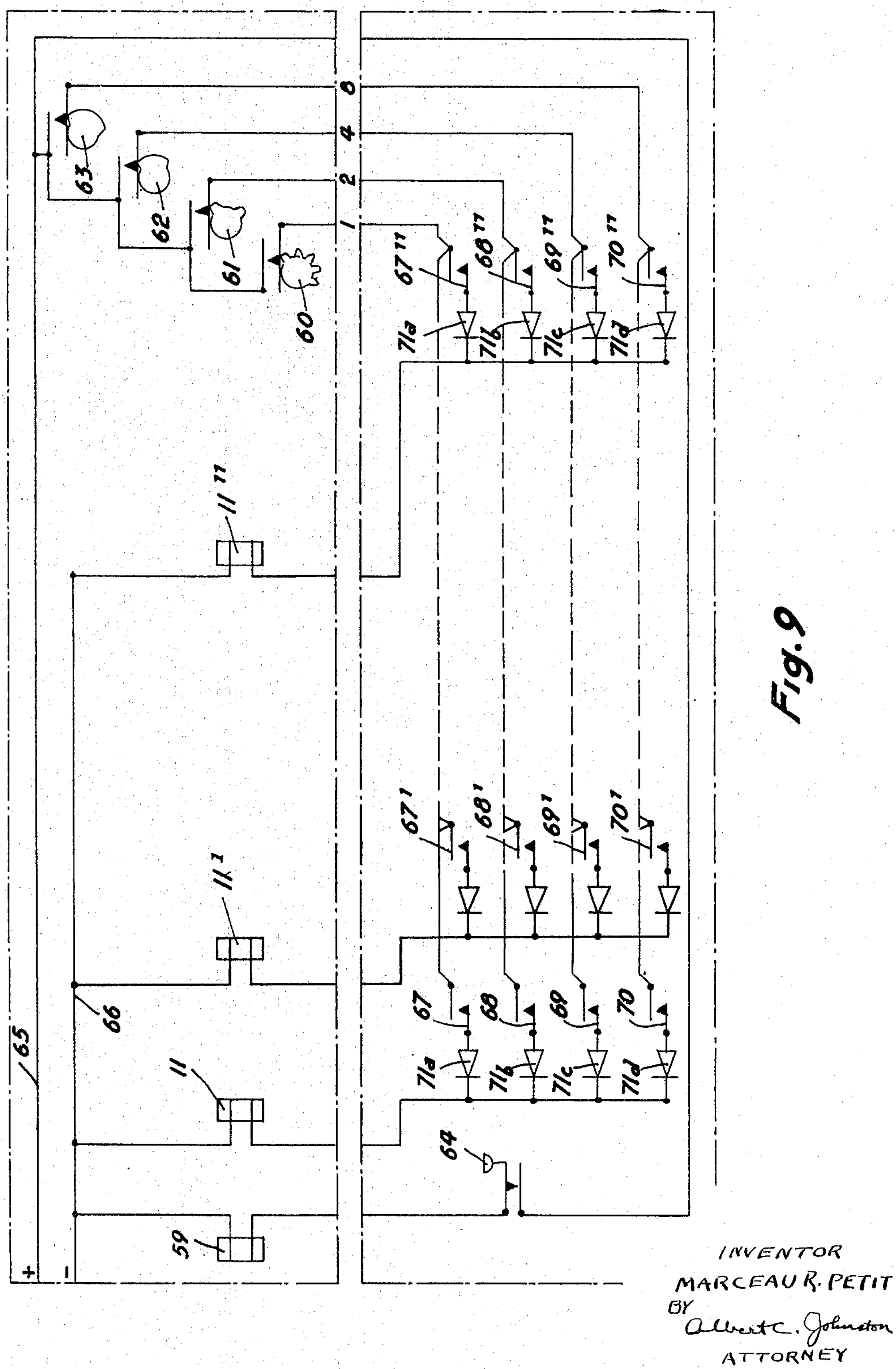
FIG. 9 shows the wiring connections for the apparatus with a source of information therefore.

In FIGURE 9 is shown the basic circuit diagram of the apparatus together with an information-transmitting source and the interconnections between the apparatus and source. It is seen that individual electromagnets 11, $11^1 \ldots 11^{11}$ and a clutch control electromagnet 59 are provided. Neither the clutch nor the electric drive motor have been illustrated; they may assume any conventional form adapted to cause one revolution of shaft 21 every time electromagnet 59 is energized. The cams 60, 61, 62, 63, respectively determine the durations of the pulses in the four binary channels.

The information source shown includes twelve sections in each of which the binary value of the information is expressed as the binary configuration (or closure pattern) of four switches 67, 68, 69 and 70 which respectively correspond to the four binary channels. In the selected example the decimal-binary code 8, 4, 2, 1, is used. Thus the switches 67, $67^1 \ldots 67^{11}$ relate to channel 1 and each represents binary 0 when open and binary 1 when closed, i.e. decimal 0 and 1 respectively. The binary values for switches 68 to $68^{11}$ are 0 and 1 and the decimal values are 0 and 2. The binary values for switches 69 to $69^{11}$ are 0 and 1 and their decimal values 0 and 4. The binary values for switches 70 to $70^{11}$ are 0 and 1 and the decimal values are 0 and 8.

All switches 67 through $67^{11}$, have a common terminal connected to a contact strip of cam 60.

All switches 68 through $68^{11}$ have a common terminal connected to a contact strip of cam 61.

All switches 69 through $69^{11}$, have a common terminal connected to a contact strip of cam 62.

All switches 70 through $70^{11}$, have a common terminal connected to a contact strip of cam 63.

The other contact strips of cams 61 through 63 are interconnected and lead to a conductor 65 connected with the positive terminal of a D.-C. source (24 volts in the selected example).

The other terminals of switches 67, 68, 69, 70 are interconnected together and with electromagnet 11.

The other terminals of contacts $67^1$, $68^1$, $69^1$, $70^1$ are interconnected together and with electromagnet $11^1$.

The same applies to the remaining switches including switches $67^{11}$, $68^{11}$, $69^{11}$ and $70^{11}$, the other terminals of which are similarly interconnected together and with electromagnet $11^{11}$.

The other terminals of electromagnets 11 through $11^{11}$, are interconnected together and with a lead 66 connected to the negative terminal of the power source.

Diodes $71_a$, $71_b$, $71_c$, $71_d$ are interposed in the respective circuits for the four binary channels in the usual manner to prevent return current flow.

A manual switch 64 is provided for completing the circuit for the clutch electromagnet 59 to initiate printing cycle command.

Figure 11:
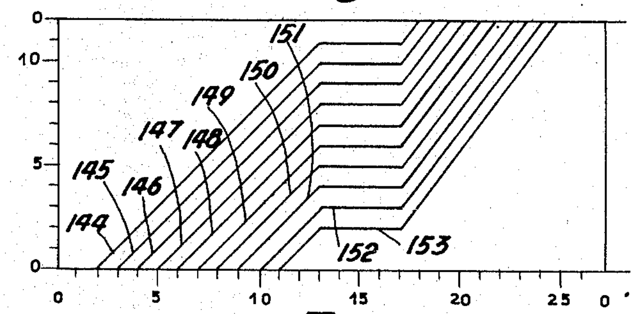
FIG. 11 is a timing chart of the type wheel movement.
Figure 12:
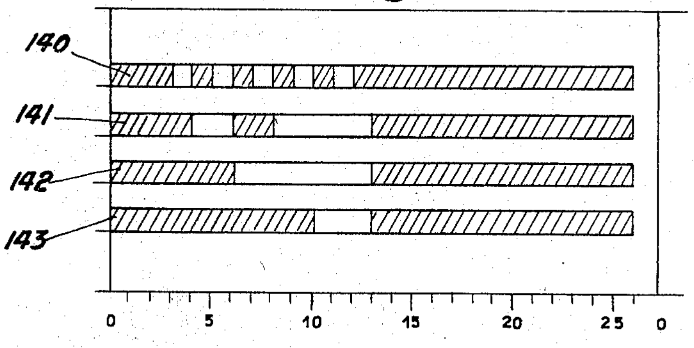
FIG. 12 is a timing chart for the 8.4.2.1 code.

The duration of the operating cycle of the apparatus which corresponds to one revolution of shaft 21' is plotted as the abscissae in the charts of FIGURES 10 to 12. The cycle is subdivided into 27 steps which each corresponds to a rotation of one tooth of the wheels 126 and 127.

The charts 140 to 143 on FIGURE 12 indicate the pulse durations supplied by the contacts of cams 60 through 63 respectively.

Chart 144 on FIGURE 11 represents the motion of the recording wheel 1–6 (the rotational displacements of which are plotted as ordinates) when the decimal value is 0.

Chart 145 represents the motion of the recording wheel 1–6 when the decimal value is 1.

Chart 146 represents this motion when the decimal value is 2.

Charts 147, 148, 149, 150, 151, 152, 153 similarly relate to the decimal values 3 through 9 respectively.

The decoding process in the example being described operates on the following principle.

Information from the transmitter is given in binary decimal form. The code used in the natural binary code 8.4.2.1.

Each decimal digit is formed from a combination of four binary digits. Hence each decimal section in the transmitter comprises four binary channels having each assigned to it a decimal value (0/1 channel, 0/2 channel, 0/4 channel, 0/8 channel).

Each channel leads to a member capable of assuming two positions, such as a switch opened for the binary value 0 and closed for the binary value 1.

The configuration or pattern of open and closed contacts in the decimal section of the transmitter represents the code for the decimal digit to be transmitted.

| Decimal digit | 0/8 channel | 0/4 channel | 0/2 channel | 0/1 channel |
|---|---|---|---|---|
| 0 | 0 | 0 | 0 | 0 |
| 1 | 0 | 0 | 0 | 1 |
| 2 | 0 | 0 | 1 | 0 |
| 3 | 0 | 0 | 1 | 1 |
| 4 | 0 | 1 | 0 | 0 |
| 5 | 0 | 1 | 0 | 1 |
| 6 | 0 | 1 | 1 | 0 |
| 7 | 0 | 1 | 1 | 1 |
| 8 | 1 | 0 | 0 | 0 |
| 9 | 1 | 0 | 0 | 1 |

In the exemplary embodiment described, the decoding of the decimal digit to be printed is effected by controlling the end of the energization period of the control electromagnet 11 . . . $11^{11}$ which determines the moment at which the related type wheel 1–6 enters into meshing engagement with the respective driving wheel 7'.

The instant at which the meshing engagement of the type wheel takes place results in a rotation of more or less great extent of said type wheel, measured as a number of steps.

The arm 2' carrying the type wheel 1–6 is held in disengaged position by the electromagnet 11 when energized. The attraction force of the electromagnet is sufficient to retain the arm but insufficient to attract it when the arm is in disengaged position.

The instant of meshing engagement is determined by the termination of the energization of the electromagnet 11.

The meshing position of the type wheel is established on termination of the energization of the electromagnet, while the latching position is produced on occurrence of the resetting action and is maintained as long as the electromagnet remains energized and as long as the drive wheel presents the tooth **7'*d***.

The latched position of each type wheel is obtained by abutment of a tooth of the set of type wheel teeth on the one hand, and on the other hand by the cooperation of a chamfered portion **5'*c* of said set of teeth with the resetting teeth 7*c* of the drive wheel 7'**.

The set of four cams 60, 61, 62, 63 control the closure and opening actions of the four switches 67, 68, 69 and 70 for definite time periods at accurately specified instants of the cycle and control the energization of the electromagnet in each section in accordance with the closure pattern of the switches as established by the transmitter.

Each type wheel 1–6 meshes with the drive wheel 7' for discrete time periods expressed as discrete numbers of steps as a function of the decoded decimal value. In the described apparatus the cycle of 27 steps corresponds to one revolution of the input shaft 21' from 0 to $2\pi$ radians.

The schedules provided by the four cams 60 to 63 are such that they cause energization of each electromagnet for a longer or shorter period depending on the closure pattern of the transmitter switches.

Using the previously mentioned binary decimal code the apparatus operates as follows.

Deenergization of a control electromagnet 11, $11^1 \ldots 11^{11}$ permits the meshing engagement of the corresponding type wheel 1–6 with the teeth **7'*a* of its drive wheel 7'**. Depending on the instant of deenergization, the type wheel rotates by a certain angle expressed as a number of steps.

The control circuit for the electromagnet 11, 11[1] . . . 11[11] for each section extends through the transmitter. Depending on the selected channels, the current flows for a predetermined time at a precisely defined instant of the cycle as determined by the operation of the four cams 60, 61, 62, 63 corresponding to the four binary channels of the transmitter. The cams are driven homokinetically (at constant angular velocity) from the decoder input shaft and control the closure of four switches connected on one side to lead 65 connected to a terminal of a power source and on the other side to switches 67 . . . 70 of the four binary channels of each transmitter section.

The first cam 60 corresponding to the set of all channels 0/1 closes the switch in accordance with the timing chart 140 of the diagram of FIGURE 12.

The second cam 61 corresponding to the set of all channels 0/2 closes the switch in accordance with the timing chart 141 of the diagram of FIGURE 12.

The third cam 62 corresponding to the set of all channels 0/4 closes the switch in accordance with the timing chart 142 of the diagram of FIGURE 12.

The fourth cam 63 corresponding to the set of all channels 0/8 closes the switch in accordance with the timing chart 143 of the diagram of FIGURE 12.

As previously mentioned, in the example described the duration of the cycle is 27 steps corresponding to a rotation of input shaft 21' from 0 to $2\pi$ radians.

Depending on the closure pattern of the switches as determined by the transmitter in each section, the energization of the electromagnet follows the schedules determined by the cams 60, 61, 62, 63. Thus when the transmitted decimal value is the digit 1, the electromagnet is energized five times, each energization period lasts one step and is spaced from the next energized period by a time interval of one step.

The first cut-off determines the instant of meshing engagement for the decimal value 1.

When the transmitted decimal value is 2, the electromagnet is energized twice for a period of two steps, each energized period being separated from the next by an interval of two steps. The first cut-off determines the instant of meshing engagement for the value 2.

When the transmitted decimal value is 4 the electromagnet is energized for a period of four steps, the end of the energized period determining the instant of meshing engagement for the value 4.

When the decimal value transmitted is 8 the electromagnet stays energized for eight steps, the termination of the energized period determining the instant of meshing engagement for the value 8.

For the value 3 the electromagnet is energized for three steps. Current flows through the channels 0/1 and 0/2 which are completed. The schedules for which cams 60 and 61 are programmed determine the instant of meshing engagement for value 3. The cam 61 permits energization of the electromagnet for a period of two steps. As the circuit is about to be cut off at cam 61 the circuit is reestablished for a period of 1 step at cam 60, and the electromagnet therefore stays energized for 2 steps+1 step=3 steps.

For the value 5 the electromagnet is energized for five steps due to the combined schedules determined by cams 60 and 62. The cam 62 permits energization for four steps at the instant the circuit is about to be cut off, after which the cam 60 reestablishes the circuit for a period of one step; the electromagnet thus remains energized for 4 steps+1 step=5 steps.

For the value 6 the electromagnet is energized for six steps due to the combined schedules determined by the cams 61 and 62.

For the value 7 the electromagnet remains energized for 7 steps owing to the combined schedules programmed on cams 60, 61 and 62.

For the value 9 the electromagnet remains energized for nine steps owing to the combined schedules programmed on cams 60 and 63.

Consequently the type wheel 1–6 of a printing section rotates a number of steps equal to the complement of the transmitted digit and its rotation represents the decimal digit transmitted. Thus, if the drive wheel advances ten steps for example before termination of the printing operation, the type wheel will rotate ten steps for the value 0, nine steps for the value 1, and so on.

It will thus be understood that at the start of the cycle the arms 2' are in the so-called latched position and each type wheel 1–6 is in zero position as shown in FIGURE 2.

During the first part of the cycle the cams 60 to 63, as they close the switches 67 to 70, send calibrated pulses which are only passed through the switch matrix of the transmitter where said switches are closed, for application to the electromagnets 11.

Figure 4:
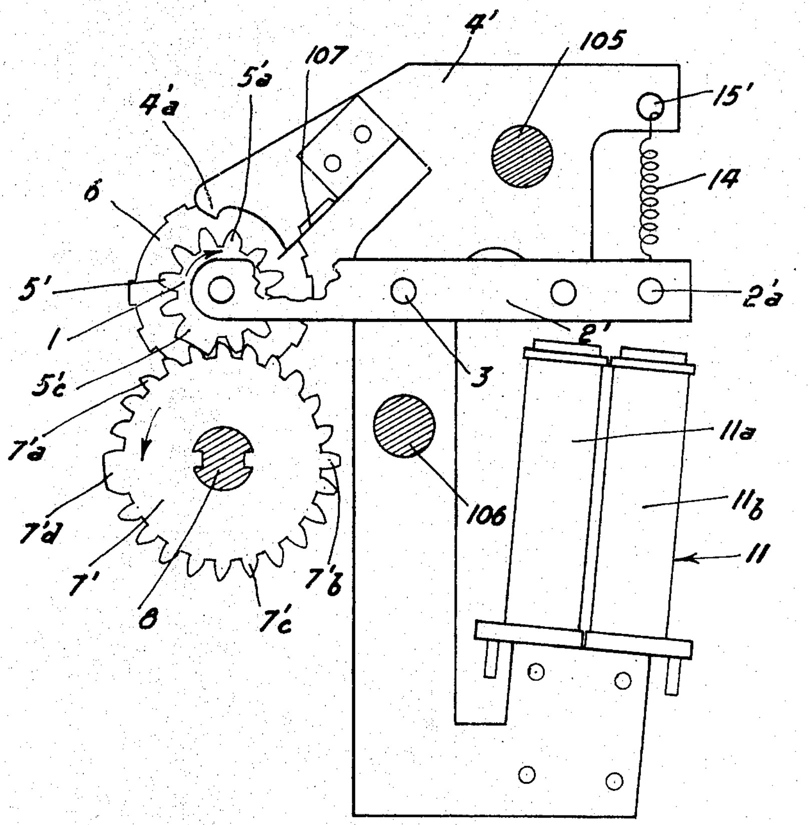
FIG. 4 illustrates a type wheel in meshing position just after the value-reading step.

Energization of an electromagnet 11 causes the corresponding arms 2' to be maintained in latched position. Termination of the energization period determines the time at which the corresponding type wheel 1–6 meshes with the gear sector 7'a of the drive wheel 7' (FIGURE 4).

The type wheel 1–6 thus advances nine teeth if the pulse is transmitted from cam 60, eight teeth if the pulse is transmitted from cam 61, six teeth if the pulse is transmitted from cam 62, and two teeth if the pulse is transmitted from cam 63. The wheel will finally advance by a number of teeth depending on the number of pulses transmitted by the cams.

Figure 5:
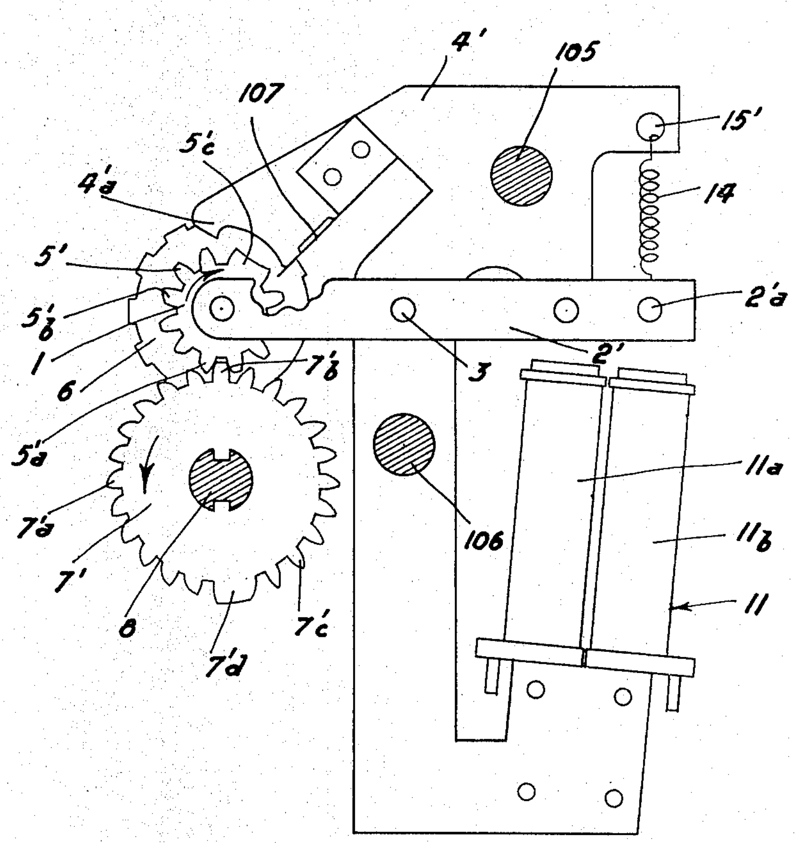
FIG. 5 shows the type wheel in printing position.

At the end of the pulses transmitted by cams 60 to 63, each of the type wheels 1–6 has been rotated to the printing position, for example, as shown in FIGURE 5, by the number of teeth corresponding to the decimal value present in binary form in the transmitter. The type disks 6 are so oriented that the digit presented to the surface of the paper strip is the decimal digit just decoded. Printing occurs upon impact of the printing bar 27.

As soon as the printing is achieved, cam 23 (FIGURE 8) resets the printing bar, this movement causes pawl 33 (FIGURES 1 and 8) to angularly advance the paper-driving cylinder 40.

The drive wheel 7' then turns from the printing position, and brings the tooth 5'c in front of one of the teeth 7'c of the wheel 7' (FIG. 5). Since the tooth 5'c does not permit meshing engagement, the type wheel 1–6 is pushed away from drive wheel 7' and correspondingly displaces the arms 2'. The tooth 5'a reaches a position in abutment against the nose 4'a, the tooth 5'b engages under the spring leaf 107 and the armature 13 engages the core of electromagnet 11.

The cycle is thus terminated leaving the components in their initial positions.

What I claim is:

1. An apparatus for decoding binary digital data and for recording the decoded numerical values, comprising:

A printing section for each place of the numerical values to be recorded, each said section including a rotary type wheel carrying digital printing elements and having a zero rotational position, a cyclically movable driving member, a support means rotatably carrying said type wheel and movable for displacement of said type wheel between a meshing position and a locked position, said type wheel and said driving member respectively having constant-pitch gear teeth extending over active portions thereof, said teeth being engageable in mesh when said type wheel is in said meshing position and said teeth of said type wheel being spaced away from said teeth of said driving member when said type wheel is in said locked position, yieldable means urging said type wheel toward said meshing position, means associated with said driving member and type wheel and operative when said type wheel is in said zero position for displacing said type wheel bodily away from said driving member to said locked position, means operative when said type wheel is in said locked position to hold said type wheel against rotation, said driving member including means for resetting said type wheel to said zero position following a meshing engagement of said gear teeth, and an electromagnet operative when energized to retain said type wheel in said locked position against the force of said yieldable means;

means operable to effect a single complete cycle of movement of said driving member of each said section and to interrupt the movement thereof in the course of each such cycle;

means for energizing said electromagnet of each said printing section at the point in each such cycle when said teeth of said driving member would begin to engage and drive said teeth of said type wheel if said type wheel were in said meshing position, and for holding said electromagnet energized for a period corresponding to a digit of the numerical value to be recorded, whereby said type wheel will be displaced to said meshing position only at the end of said period and the interval between the end of said period and the interruption of the movement of said driving member will determine the extent of rotation of said type wheel from its zero rotational position;

and means operable during said interruption to cause a printing element of said type wheel of each said section to imprint a digit corresponding to said extent of rotation of the type wheel.

2. An apparatus as in claim 1;

wherein said support means of each said printing section further carries an armature and said electromagnet has a core engaging said armature when said type wheel is in said locked position; and wherein said electromagnet, when energized, produces a magnetic force sufficient to attract and hold said armature to said core against the force of said yieldable means only when said armature is in contact with said core.

3. An apparatus as in claim 1; wherein said means operable to effect a single complete cycle of movement of the driving member of each said section includes a drive shaft rotated through a single complete revolution during each said cycle, first and second driving gears fixed on said drive shaft and having gear teeth on portions of their respective peripheries which are angularly spaced from each other, first and second driven gears fixed on said driving wheel shaft and having gear teeth on portions of their respective peripheries which are angularly spaced from each other, said gear teeth of said first driving and driven gears being engageable to rotate said driving wheel shaft during an initial portion of each revolution of said drive shaft and said gear teeth of the second driving and driven gears being engageable to rotate said driving wheel shaft during a following portion of the revolution of the drive shaft which is spaced from said initial portion, and stabilizing surface portions on said first and second driving and driven gears engageable in the interval between said initial and following portions of each revolution of the drive shaft to effect said interruption of the movement of the driving member.

4. An apparatus as in claim 1;

wherein said means operative to hold said type wheel against rotation includes fixed abutment means engaging teeth of said type wheel when the latter is in said locked position.

5. Apparatus as in claim 1;

wherein said means for energizing said electromagnet of each said printing section includes means defining a source of the binary digital data to be decoded and recorded and having a plurality of binary channels and connecting means extending from said binary channels to said electromagnet of each said printing section, which connecting means are selectively closed in accordance with the binary digital data to be decoded and recorded during each said cycle of movement of said driving member, and single pulse generating means connected with said binary channels and producing, during each said cycle, at least one pulse of predetermined duration in each binary channel for transmission through the selectively closed connecting means so as to energize the electromagnet of the associated printing section and thereby determine said period of energization.

6. An apparatus as in claim 5;

wherein said pulse generating means includes contact means interposed in each of said binary channels, and control means for each said contact means operative during each said cycle to close the corresponding contact means for at least one predetermined period of time dependent on the binary coding of the data.

7. An apparatus as in claim 6;

wherein each said control means of the pulse generating means includes a cam, and the cams of the pulse generating means are rotated simultaneously in synchronism with said cycle of movement of said driving member in each said section.

8. An apparatus as in claim 1;

wherein said constant-pitch gear teeth of the type wheel constitute part of gear included in said type wheel, and said means for displacing the type wheel to said locked position when in said zero rotational position includes a blank portion on said gear included in said type wheel, which blank portion is located to engage said driving member when said type wheel is in its zero position.

9. An apparatus as in claim 8;

wherein said driving member is in the form of a gear rotatable through a single revolution during said cycle and having said constant-pitch gear teeth extending along a sector thereof; and wherein said means for resetting the type wheel to said zero position includes resetting gear teeth extending along a sector of said driving gear which follows said sector of the constant-pitch gear teeth and which are engageable with said teeth of the gear included in said type wheel after said interruption to further rotate the type wheel until said blank portion engages said resetting teeth.

10. An apparatus as in claim 9;

wherein said driving gear also includes a blank portion engageable with said blank portion of the gear included in the type wheel at the beginning and end of said cycle so as to hold said type wheel in said locked position.

References Cited by the Examiner

UNITED STATES PATENTS

| | | | |
|---|---|---|---|
| 2,675,108 | 4/1954 | Ruderfer | 101—93 |
| 2,715,998 | 8/1955 | Stanley | 101—110 X |

ROBERT E. PULFREY, *Primary Examiner.*

WILLIAM B. PENN, *Examiner.*